United States Patent
Dias et al.

(10) Patent No.: US 9,854,222 B2
(45) Date of Patent: Dec. 26, 2017

(54) DETERMINATION OF THE IMAGE DEPTH MAP OF A SCENE

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(72) Inventors: Jerome Dias, Villeurbanne (FR); David Alleysson, Moirans (FR); Stephane Getin, Grenoble (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 0 days.

(21) Appl. No.: 15/037,713

(22) PCT Filed: Nov. 17, 2014

(86) PCT No.: PCT/EP2014/074804
§ 371 (c)(1),
(2) Date: May 19, 2016

(87) PCT Pub. No.: WO2015/075005
PCT Pub. Date: May 28, 2015

(65) Prior Publication Data
US 2016/0301911 A1    Oct. 13, 2016

(30) Foreign Application Priority Data
Nov. 19, 2013 (FR) ..................... 13 61340

(51) Int. Cl.
*G06K 9/00* (2006.01)
*H04N 13/00* (2006.01)
(Continued)

(52) U.S. Cl.
CPC ..... *H04N 13/0022* (2013.01); *G06K 9/00201* (2013.01); *G06K 9/209* (2013.01);
(Continued)

(58) Field of Classification Search
CPC .. H04N 5/23235; H04N 5/332; H04N 5/3572; H04N 2013/0081;
(Continued)

(56) References Cited

U.S. PATENT DOCUMENTS

| 7,626,769 B2 | 12/2009 | Olmstead et al. |
| 2011/0026909 A1 | 2/2011 | Liege et al. |

(Continued)

FOREIGN PATENT DOCUMENTS

WO    2009/019362 A1    2/2009

OTHER PUBLICATIONS

Jerome Dias et al: "Estimation de la profondeur par analyse de nettete", Oct. 4, 2010, XP055127127, Extrait de l'Internet: URL:http://www.pole-ora.com/pages/projets/Journee3D/PoleORA_J3D_14102010_Poster_Dias.pdf [extrait le Jul. 7, 2014].
(Continued)

*Primary Examiner* — Ali Bayat
(74) *Attorney, Agent, or Firm* — Young & Thompson

(57) ABSTRACT

A method for estimating the image depth map of a scene, includes the following steps: providing (E1) an image, the focus of which depends on the depth and wavelength of the considered object points of the scene, using a longitudinal chromatic optical system; determining (E2) a set of spectral images from the image provided by the longitudinal chro-
(Continued)

matic optical system; deconvoluting (E3) the spectral images to provide estimated spectral images with field depth extension; and analyzing (E4) a cost criterion depending on the estimated spectral images with field depth extension to provide an estimated depth map.

20 Claims, 3 Drawing Sheets

(51) Int. Cl.
G06K 9/20 (2006.01)
H04N 9/083 (2006.01)
H04N 9/76 (2006.01)
H04N 13/02 (2006.01)

(52) U.S. Cl.
CPC ........... *G06K 9/2018* (2013.01); *H04N 9/083* (2013.01); *H04N 9/76* (2013.01); *H04N 13/0257* (2013.01); *H04N 2013/0081* (2013.01); *H04N 2209/045* (2013.01)

(58) Field of Classification Search
CPC .. H04N 2209/045; H04N 9/646; H04N 9/083; H04N 9/76; H04N 9/64; H04N 13/0257; H04N 13/0022; G06K 9/00201; G06K 9/2018; G06K 9/209; G06T 2207/30244
See application file for complete search history.

(56) References Cited

U.S. PATENT DOCUMENTS

2013/0194375 A1* 8/2013 Michrowski ........... H04N 7/147 348/14.07
2013/0278726 A1* 10/2013 Muhammad ........... H04N 9/045 348/46
2014/0267608 A1* 9/2014 Dhome ................. G06T 7/579 348/43
2016/0007005 A1* 1/2016 Konieczny ........... H04N 19/597 348/43
2016/0098858 A1* 4/2016 Patkar ..................... G06T 7/73 345/420

OTHER PUBLICATIONS

Pauline Trouve: "Conception conjointe optique/traitement pour un imageur compact a capacite 3D", These de Doctorat, Dec. 10, 2012 (Dec. 10, 2012), pp. 1-241, XP055126368, Palaiseau, France Extrait de l'Internet: URL: http://tel.archives-ouvertes.fr/docs/00/79/73/82/PDF/Trouve_2012.pdf [extrait le Jul. 2, 2014].
Ferreol Soulez et al: "Joint deconvolution and demosaicing", Image Processing (ICIP), 2009 16th IEEE International Conference on, IEEE, Piscataway, NJ, USA, Nov. 7, 2009 (Nov. 7, 2009), pp. 145-148, XP031628815, ISBN: 978-1-4244-5653-6.
Ayan Chakrabarti et al: "Depth and Deblurring from a Spectrally-Varying Depth-of-Field", Oct. 7, 2012 (Oct. 7, 2012), Computer Vision ECCV 2012, Springer Berlin Heidelberg, Berlin, Heidelberg, pp. 648-661, XP047019055, ISBN: 978-3-642-33714-7 le document en entier.
Oliver Cossairt et al: "Spectral Focal Sweep: Extended depth of field from chromatic aberrations", Computational Photography (ICCP), 2010 IEEE International Conference on, IEEE, Piscataway, NJ, USA, Mar. 29, 2010 (Mar. 29, 2010), pp. 1-8, XP031763031, ISBN: 978-1-4244-7022-8.
Benjamin Milgrom et al: "Novel approach for extending the depth of field of Barcode decoders by using RGB channels of information", Optics Express, Oct. 27, 2010 (Oct. 27, 2010), pp. 17027-17039, XP055126443, DOI: http://dx.doi.org/10.1364/OE.18.017027 Extrait de l'Internet: URL:http://www.opticsinfobase.org/oe/abstr act.cfm?URI=oe-18-16-17027 [extrait le Jul. 2, 2014].
International Search Report, dated Jan. 23, 2015, from corresponding PCT application.

* cited by examiner

DETERMINATION OF THE IMAGE DEPTH MAP OF A SCENE

TECHNICAL FIELD

The present invention relates primarily to determining an image depth map of a scene.

An image depth map has many applications, including dimensional analysis of an object in the scene or the segmentation of elements in the scene.

The invention also relates to determining the image with extended depth of field of the scene.

The technical areas covered by the invention are numerous: human-computer interaction (HCI), augmented reality (AR), microscopy, entertainment industry, automotive industry, home automation, dimensional verification, security, and video surveillance are some examples.

STATE OF PRIOR ART

There are two categories of 3D imaging devices: passive systems, which do not require projecting light on the scene to determine the depth, and active systems. We are only interested in the passive systems.

Document WO 2009/019362 relates to an optical device provided with a device to increase its depth of field.

The optical system has uncorrected longitudinal chromatic aberration. The color images obtained are degraded by the longitudinal chromatic aberration. Such an optical device focuses the blue, green and red components of these color images, for objects that are respectively "close", "intermediate", and "distant". By inverting the chromatic aberration on these images, the sharp component is used to reconstruct the defocused other components. The reconstructed color images thus have a depth of field greater than would be captured with an equivalent optical system for which the longitudinal chromatic aberration is corrected.

This method only considers images composed of three channels, red, green, and blue, and therefore only handles objects at three depths, "close", "intermediate", and "remote".

A method for determining the depth map and the image with extended depth of field of a scene is described in the document entitled "Coded aperture pairs for depth from defocus and defocus deblurring" by Zhou, Lin, and Nayar, published in 2011 in "International Journal on Computer Vision."

This method is one of the techniques for estimating depth from defocus (DFD). It uses two shots of the same scene, with different coded apertures.

The depth map is obtained by analyzing the defocus variation between the two images and minimizing a cost criterion at each point of the image. An image with extended depth of field of the scene is then estimated from the depth map.

PRESENTATION OF THE INVENTION

The invention aims to solve the problems of the prior art by providing a method for estimating the image depth map of a scene, characterized in that it comprises the steps of:
 providing an image in which the focus depends on the depth and wavelength of the considered object points of the scene, using a longitudinal chromatic optical system,
 determining a set of spectral images from the image provided by the longitudinal chromatic optical system,
 deconvoluting the spectral images in order to provide estimated spectral images with extended depth of field, and
 analyzing a cost criterion that is dependent on the estimated spectral images with extended depth of field, in order to provide an estimated depth map.

With the invention, it is possible to construct the image depth map of a scene from a single captured image, with a passive single-sensor system.

This embodiment allows operation real time.

In a preferred feature, the step of determining a set of spectral images comprises the steps of:
 receiving the image formed by the longitudinal chromatic optical system and forming a mosaic image, using an image sensor equipped with a plurality of spectral filters,
 demosaicing the mosaic image to provide a set of filtered images,
 performing spectral estimation to receive the set of filtered images and provide the set of spectral images.

In a preferred feature, the step of analyzing a cost criterion comprises:
 forming a mosaic image reconstructed from the estimated spectral images with extended depth of field of the scene,
 estimating the depth at each point of the image by minimizing a cost criterion that is dependent on a point-to-point squared difference between the mosaic image formed and the mosaic image reconstructed from estimated spectral images with extended depth of field of the scene, for depths in a predetermined depth domain.

In a preferred feature, the method further comprises a step of estimating a set of spectral images with extended depth of field of the scene, for the estimated depth map provided in the analysis step.

In a preferred feature, estimating the set of spectral images with extended depth of field of the scene comprises selecting, by iterating on the depth, values of spectral images with extended depth of field provided in the deconvolution step for which the considered depth corresponds to the estimated depth map provided in the analysis step.

In one embodiment of the invention, the spectral estimation step and the spectral image deconvolution step are combined into a single step.

In another embodiment of the invention, the demosaicing step, the spectral estimation step, and the spectral image deconvolution step are combined into a single step, and this step uses images from a database of images to calculate a transfer matrix for converting between the space of the mosaic image and the space of the spectral images.

The invention also relates to a device for estimating the image depth map of a scene, characterized in that it comprises:
 a longitudinal chromatic optical system for providing an image in which the focus depends on the depth and wavelength of the considered object points of the scene,
 a spectral image sensor for receiving the image provided by the longitudinal chromatic optical system and for providing a set of spectral images,
 a module for deconvoluting the spectral images in order to provide estimated spectral images with extended depth of field, and
 a module for analyzing a cost criterion that is dependent on the estimated spectral images with extended depth of field, in order to provide an estimated depth map.

The device according to the invention has advantages similar to those mentioned above.

In a preferred feature, the spectral image sensor comprises:
- an image sensor equipped with a plurality of spectral filters, for receiving the image provided by the longitudinal chromatic optical system and for providing a mosaic image,
- a demosaicing module for receiving the mosaic image and for providing a set of filtered images,
- a spectral estimation module for receiving the set of filtered images and for providing the set of spectral images.

In a preferred feature, the module for analyzing a cost criterion comprises:
- means for forming a mosaic image reconstructed from the estimated spectral images with extended depth of field of the scene,
- means for estimating the depth at each point in the image, adapted to minimize a cost criterion that is dependent on a point-to-point squared difference between the mosaic image formed and the mosaic image reconstructed from the estimated spectral images with extended depth of field of the scene, for depths in a predetermined depth domain.

In a preferred feature, the device further comprises a module for estimating a set of spectral images with extended depth of field of the scene, for the estimated depth map provided by the analysis module.

In a preferred feature, the module for estimating the set of spectral images with extended depth of field of the scene is adapted to select, by iterating on the depth, values of spectral images with extended depth of field provided by the deconvolution module for which the considered depth corresponds to the estimated depth map provided by the analysis module.

In a preferred feature, the spectral estimation module and the spectral image deconvolution module are combined into a single module.

In another preferred feature, the demosaicing module, the spectral estimation module, and the spectral image deconvolution module are combined into a single module which is adapted to use images from a database of images to calculate a transfer matrix for converting between the space of the mosaic image and the space of the spectral images.

In one particular embodiment, the steps of the method according to the invention are implemented by instructions of a computer program.

The invention therefore also relates to a computer program on an information medium, the program being suitable for execution in a computer, the program comprising instructions adapted for implementing the steps of a method as described above.

This program may use any programming language and be in the form of source code, object code, or an intermediate code between source code and object code, such as in a partially compiled form, or in any other desirable form.

The invention also relates to an information medium readable by computer and comprising computer program instructions adapted to implement the steps of a method as described above.

The information medium may be any entity or device capable of storing the program. For example, the medium may consist of a storage medium such as ROM, for example a CD-ROM or a microelectronic circuit ROM, or a magnetic recording medium such as a diskette or hard drive.

Or the information medium may be a transmissible medium such as an electrical or optical signal which can be conveyed via electrical or optical cable, by radio, or by other means. The program of the invention may in particular be downloaded over an Internet type of network.

Alternatively, the information medium may be an integrated circuit in which the program is embedded, the circuit being adapted to execute or to be used in the execution of the method according to the invention.

BRIEF DESCRIPTION OF DRAWINGS

Other features and advantages will become apparent upon reading a preferred embodiment given by way of non-limiting example, described with reference to figures in which.

DETAILED DESCRIPTION OF SPECIFIC EMBODIMENTS

Figure 1:
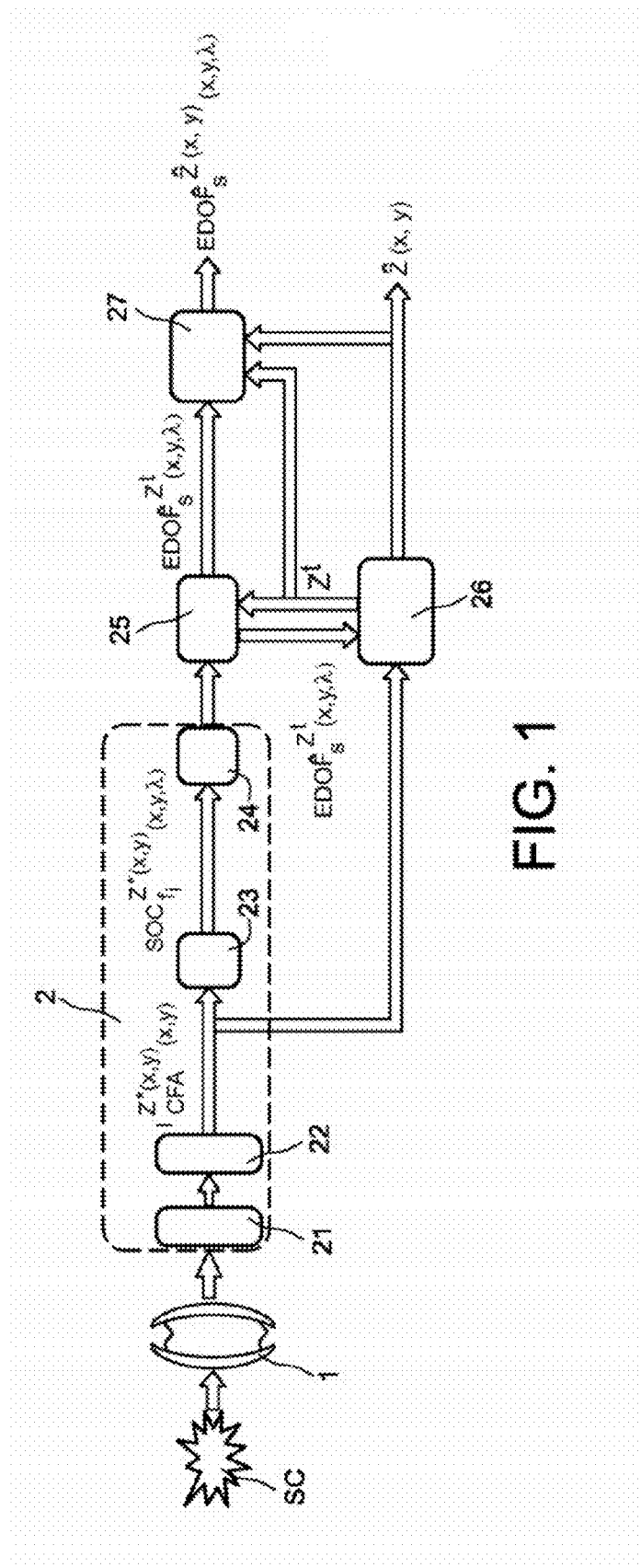
FIG. 1 represents a device for estimating the image depth map of a scene according to the invention.

According to a preferred embodiment described with reference to FIG. 1, a device for estimating the image depth map of a scene according to the invention comprises a longitudinal chromatic optical system 1.

Such a system has the characteristic of maintaining the longitudinal chromatic aberration and minimizing the other aberrations.

The longitudinal chromatic aberration is due to the presence in the optical system of optical elements in which the materials have refractive indices dependent on the wavelength in vacuum of the ray of light passing through them. Thus the focal length of the optical system 1 is dependent on the wavelength that traverses it. The focal length increases with the wavelength. The focal length is greater for red than for blue.

In other words, considering a given object point and its image through the longitudinal chromatic optical system, the focal distance and the image defocus are dependent on the depth and on the wavelength in vacuum of the considered object point. The given object point has a spectral signature in terms of image focus that is specific to the fixed properties of the system and to the distance of the object point relative to the optical system.

It should be noted that the longitudinal chromatic optical system has no transverse or lateral chromatic aberrations, and therefore no perspective distortion related to spectral variation of the lens. The focal length only varies longitudinally, as a function of the wavelength. Thus, a given object point corresponds to the same image point regardless of the wavelength.

When the longitudinal chromatic optical system 1 is used to capture an image of a scene SC, it carries out a spectral modulation of the image according to the depth and wavelength of the object point corresponding to the image point considered.

The longitudinal chromatic optical system 1 has an output connected to an input of a spectral image sensor 2 to which it delivers the result of the spectral modulation of the image.

From this input, the spectral image sensor 2 comprises a matrix image sensor 21 on which is placed a color filter array 22. The color filters may be colored resins, but a person skilled in the art may use other known filters such as interference filters or nanostructured filters. The spatial position and the spectral response of each color filter are optimized to facilitate reconstruction of the desired spectral images. The matrix image sensor 21 and the color filter array 22 allow estimating the spectral composition of the scene in a single image capture.

The matrix image sensor 21 and the color filter array 22 output a mosaic image $I_{CFA}^{Z^*(x,y)}(x,y)$.

The actual spectral images of the scene, denoted $EDOF_S(x,y,\lambda)$, are geometric projections on the plane of the sensor 21 of rays from the scene concerned.

Considering a coordinate system of the image sensor 21, one can mathematically express the mosaic image $I_{CFA}^{Z^*(x,y)}(x,y)$ as a function of the actual spectral images of the observed scene, the characteristics of the longitudinal chromatic optical system, the characteristics of the color filter array, and on additive noise, according to the formula:

$$I_{CFA}^{Z^*(x,y)}(x, y) = \sum_{i=1}^{Nf} m_i(x \cdot y) \cdot \int_\lambda h_i(\lambda) \cdot PSF(x, y, Z^*(x, y), \lambda) \otimes_{(x,y)} \cdot EDOF_s(x, y, \lambda) \cdot d\lambda + \eta(x, y)$$

where:
- (x,y) are the coordinates of a point in the reference system associated with the image sensor,
- $\lambda$ is the wavelength,
- $Z^*(x,y)$ is the actual depth corresponding to the point having coordinates (x,y),
- $EDOF_S$ are the actual spectral images of the scene, and $EDOF_S(x,y,\lambda)$ is the value of the spectral image corresponding to the point having coordinates (x,y) for wavelength $\lambda$,
- PSF (Point Spread Function) is the impulse response of the longitudinal chromatic optical system and $PSF(x, y, Z^*(x,y), \lambda)$ is the value of this impulse response at the point having coordinates (x,y), for the actual depth $Z^*(x,y)$ and for wavelength $\lambda$,
- $h_i(\lambda)$ is the spectral transmission of the $i^{th}$ color filter, for wavelength $\lambda$,
- $m_i(x,y)$ is the spatial position of the $i^{th}$ color filter,
- n(x, y) is the value of the additive noise at the point having coordinates (x,y),
- $\otimes_{(x,y)}$ is the convolution operation considered at the point having coordinates (x,y),
- $N_f$ is the number of color filters.

The same notations are retained throughout the description.

The output of the color filter array 22 is connected to an input of a demosaicing module 23. The color filter array 22 delivers the mosaic image $I_{CFA}^{*(x,y)}(x,y)$ to said module.

The demosaicing module 23 estimates Nf images filtered by means of a filter $D_M$ which is applied to the mosaic image $I_{CFA}^{Z^*(x,y)}(x,y)$, where Nf is the number of color filters in the array 22. The filtered images are at the resolution of the mosaic image $I_{CFA}^{Z^*(x,y)}(x,y)$ in the reference system associated with the image sensor.

Figure 4:
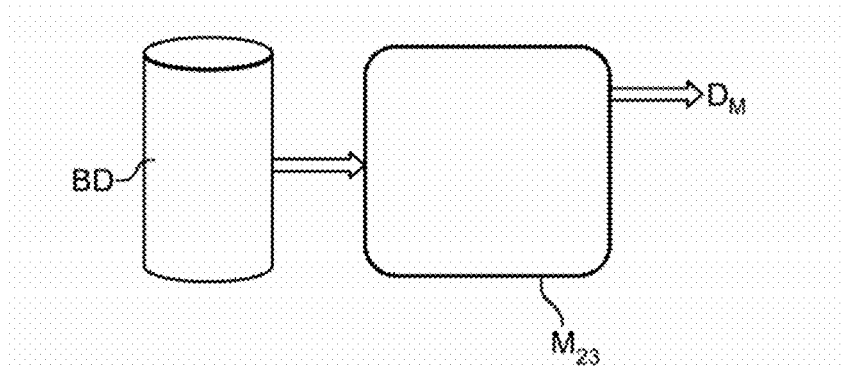
FIG. 4 shows the calculation of a filter used in a demosaicing module of the device according to the invention.

FIG. 4 represents the calculation of filter $D_M$. A module $M_{23}$ for calculating the filter $D_M$ uses spectral images supplied by a database BD of spectral images to construct reference filtered images and mosaic images, according to spatial and spectral properties of the filter array concerned.

The calculation module determines a linear matrix filter $D_M$ that is optimal in the least squares sense. The optimal linear matrix filter $D_M$ is determined by minimizing the squared difference between the reference filtered images and the filtered images estimated by applying the filter $D_M$ to the corresponding mosaic image.

The optimal linear matrix filter $D_M$ enables transfer from the space of the mosaic images to the space of the corresponding filtered images.

Thus, the demosaicing module 23 allows transfer from the mosaic image $I_{CFA}^{Z^*(x,y)}(x,y)$ to filtered images. The filtered image $SOC_{f_i}^{Z^*(x,y)}(x,y)$ which would be seen through the longitudinal chromatic optical system and the $i^{th}$ filter which would be placed entirely on the image sensor for an object at actual depth $Z^*(x,y)$ is given by the formula:

$$SOC_{f_i}^{Z^*(x,y)}(x,y) = \int_\lambda h_i(\lambda) \cdot PSF(x,y,Z^*(x,y)) \otimes_{(x,y)} \cdot EDOF_S(x,y,\lambda) \cdot d\lambda + \eta(x,y)$$

This formula assumes that these filtered images are given by the sum of the actual filtered images (left term) and a noise term (right term). In this case, the estimation errors related to demosaicing are contained in this term of additional noise. This term is not strictly identical to the noise term in the equation of the mosaic image considered (although the notation is the same). However, we considered that the demosaicing algorithm used induces in each filtered image a noise term whose statistical properties are identical to those of the noise of the mosaic image. It is the preservation of statistical properties which is exploited here.

The demosaicing thus results in a set of Nf filtered images $SOC_{f_i}^{Z^*(x,y)}(x,y)$.

The output of the demosaicing module 23 is connected to an input of a spectral estimation module 24. The demosaicing module 23 delivers the Nf filtered images $SOC_{f_i}^{Z^*(x,y)}(x,y)$ to module 24.

The spectral estimation module 24 determines $N\lambda$ spectral images by means of a linear matrix inversion filter $F_S$ applied to the Nf filtered images. The operation of module 24 is described in detail below.

Each spectral image relates to a wavelength sample. The number $N\lambda$ of spectral images depends on the range of wavelengths of the spectral imaging system and on the size of a spectral sample.

In one particular embodiment, the number of filters in the filter array is equal to the number of spectral images desired. In this case, the spectral images are the images filtered by the demosaicing module. In other words, the demosaicing directly provides the spectral image, and spectral estimation is not necessary.

The output of the spectral estimation module 24 is connected to an input 25 of a deconvolution module. The spectral estimation module 24 delivers the $N\lambda$ spectral images to module 25.

Module 25 applies deconvolution by means of a linear matrix inversion filter $C^Z$, to the $N\lambda$ spectral images provided by module 24, for a test depth $Z^t$ given by module 26 described below.

The deconvolution module 25 determines estimated spectral images with extended depth of field $\widehat{EDOF}_S^Z(x,y,\lambda)$, with the assumption that $Z^t$ is the actual depth of the observed scene.

The output from the deconvolution module 25 is connected to an input of a module 26 for estimating the actual depth map of the scene considered. The deconvolution module 25 delivers the estimated spectral images with extended depth of field $\widehat{EDOF}_S^{Z}(x,y,\lambda)$ that he has determined in module 26.

The output of the color filter array 22 is also connected to an input of module 26. The array 22 delivers the mosaic image $I_{CFA}^{Z^*(x,y)}(x,y)$ to module 26.

Module 26 determines an estimation $\hat{Z}(x,y)$ of the actual depth map $Z(x,y)$ of the scene considered, based on a minimization of a cost criterion calculated from the mosaic image $I_{CFA}^{Z^*(x,y)}(x,y)$ provided by the array 22 and from the $N\lambda$ estimated spectral images $\widehat{EDOF}_S^{Z}(x,y,\lambda)$ provided by module 25.

An output of module 26 is connected to an input of the deconvolution module 25, to provide it with the test depth $Z^t$.

The operation of module 26 is detailed below.

The output of the deconvolution module 25 is connected to an input of an adaptive pixel selection module 27. The deconvolution module 25 supplies the $N\lambda$ estimated spectral images $\widehat{EDOF}_S^{Z}(x,y,\lambda)$ to module 27.

The output of the module 26 for estimating the actual depth map of the scene is connected to an input of the adaptive pixel selection module 27. Module 26 supplies the estimation $\hat{Z}(x,y)$ of the actual depth map of the scene to module 27.

The adaptive pixel selection module 27 determines $N\lambda$ estimated spectral images with extended depth of field $\widehat{EDOF}_S^{\hat{Z}(x,y)}(x,y,\lambda)$ adapted to the estimated depth map $\hat{Z}(x,y)$. The operation of module 27 is detailed below.

In a preferred embodiment, the spectral estimation module 24 and the spectral image deconvolution module 25 are combined into a single module.

In this case, a test depth domain is considered. For a given test depth $Z^t$ within this domain, $N\lambda$ estimated spectral images $\widehat{EDOF}_S^{Z}(x,y,\lambda)$ are determined. This estimation is performed based on Nf filtered images $SOC_{f_i}^{Z^*(x,y)}(x,y)$, for example after Fourier transform of the mathematical formula giving the filtered images, then transposition of the expression obtained in linear matrix form.

This embodiment is based on the assumption that the object scene is planar, perpendicular to the optical axis of the system used, meaning that the object depth is independent of the coordinates (x,y).

We thus obtain the following linear matrix representation:

$$G_i^{Z^*} = H_i^{Z^*} \cdot S + N$$

where:
$G_i^{Z^*}$ is the matrix representation of the Fourier transform of the filtered image $SOC_{f_i}^{Z^*(x,y)}(x,y)$,
S is the matrix representation of the Fourier transform of the spectral images with extended depth of field $EDOF_S$ that we wish to estimate,
$H_i^{Z^*}$ is the matrix representation of the product $h_i \cdot OTF$, with OTF being the Fourier transform of the impulse response (PSF) of the optical system considered, assuming an object at actual considered depth $Z^*$,
N is the matrix representation of the Fourier transform of the additive noise $\eta$.

A least-squares estimate of matrix S is then performed in modules 24 and 25 considered together, according to the formula:

$$\hat{S}^{Z^t} = \left(\sum_{i=1}^{N_f} |H_i^{Z^t}| + C^2\right)^{-1} \cdot \sum_{j=1}^{N_f} \overline{H}_j^{Z^t} \cdot G_j^{Z^*}$$

where:
$Z^t$ is a given depth in the test domain,
$\hat{S}^{Z^t}$ is the matrix representation of the Fourier transform of the estimated spectral images with extended depth of field $\widehat{EDOF}_S^{Z}(x,y,\lambda)$, assuming depth $Z^t$ of the considered scene,
i is the index of filter $h_i$ and j is the index of filter $h_j$,
$\overline{H}_i^{Z^t}$ is the conjugate transposed matrix of $H_i^{Z^t}$,
C is a matrix adjustment parameter which allows converging toward a better estimation of the spectral images $EDOF_S$ considered.

The estimated spectral images with extended depth of field $\widehat{EDOF}_S^{Z}(x,y,\lambda)$ are then obtained by an inverse Fourier transform of matrix $\hat{S}^{Z^t}$.

In the case where the operations of modules 24 and 25 are carried out simultaneously, the matrix term, expressed in Fourier space, $$\left(\sum_{i=1}^{N_f} |H_i^{Z^t}| + C^2\right)^{-1} \cdot \sum_{j=1}^{N_f} \overline{H}_j^{Z^t}$$

represents a linear matrix inversion filter equivalent to filter $F_S \cdot C^Z$ product of filters $F_S$ and $C^Z$) for estimating the spectral images $\widehat{EDOF}_S^{Z}(x,y,\lambda)$ from filtered images $SOC_{f_i}^{Z^*(x,y)}(x,y)$.

A mosaic image is reconstructed in module 26 from the estimated spectral images and for test depth $Z^t$, according to the formula:

$$I_{CFA}^{Z^t}(x,y) = \sum_{i=1}^{Nf} m_i(x \cdot y) \cdot \int_\lambda h_i(\lambda) \cdot TF^{-1}\{\hat{S}^{Z^t} \cdot H_i^{Z^t}\}$$

The pixel-to-pixel squared difference, between the mosaic image $I_{CFA}^{Z^*(x,y)}(x,y)$ determined by module 22 and the reconstructed mosaic image $I_{CFA}^{Z^t}(x,y)$ is minimized. In other words, iteration is used to find the depth $Z^t$ at each point (x,y) in the test depth domain, which minimizes a cost criterion $W^Z(x,y)$ calculated in module 26:

$$W^{Z^t}(x,y) = \|I_{CFA}^{Z^*(x,y)}(x,y) - I_{CFA}^{Z^t}(x,y)\|^2$$

The set of estimated depth values, for all positions (x,y) of the image, gives the estimated depth map $\hat{Z}(x,y)$.

Module 27 then determines the $N\lambda$ estimated spectral images with extended depth of field $\widehat{EDOF}_S^{\hat{Z}(x,y)}(x,y,\lambda)$ by selecting, iterating on the depth $Z^t$, only the values of estimated spectral images with extended depth of field $\widehat{EDOF}_S^{Z^t}(x,y,\lambda)$ for which the considered depth $Z^t$ corresponds to the estimated depth map $\hat{Z}(x,y)$.

In another preferred embodiment, the demosaicing module 23, the spectral estimation module 24, and the spectral image deconvolution module 25 are combined into a single module.

This embodiment is based on the fact that it is possible to find a law of transfer from the mosaic image space to another space, here the space of spectral images with extended depth of field, in the form of a linear matrix representation.

Figure 5:
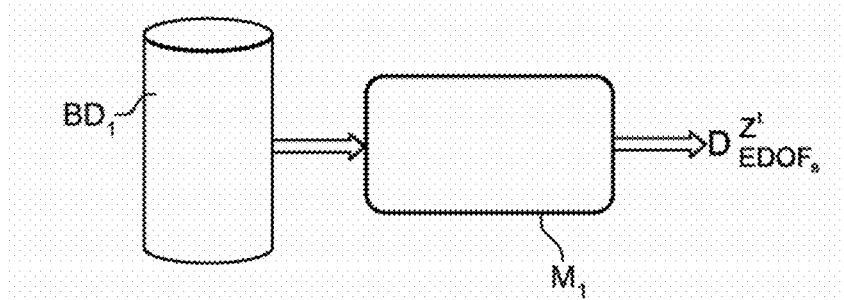
FIG. 5 shows the calculation of a transformation matrix for converting between the space of the mosaic image and the space of the spectral images.

As represented in FIG. 5, in this embodiment a calculation module $M_1$ uses images from a database of images $BD_1$ to calculate a transfer matrix $D_{EDOF_S}^{Z^t}$ for converting between the space of the mosaic image and the space of the spectral images with extended depth of field, for a test depth $Z^t$.

This embodiment is based on the assumption that the scene is a plane in the object space, perpendicular to the optical axis of the system.

The transfer matrix $D_{EDOF_S}^{Z^t}$ for converting the mosaic image to one of the images $EDOF_S$ in the space of spectral images with extended depth of field is given by the formula:

$$D_{EDOF_S}^{Z^t} = EDOF_s \cdot I_{CFA}^{Z^t\,T} \cdot \left(I_{CFA}^{Z^t} \cdot I_{CFA}^{Z^t\,T} + r0 \cdot Id\right)^{-1}$$

where:

Id represents an identity matrix of the same size as that of matrix $$I_{CFA}^{Z^t} \cdot I_{CFA}^{Z^t\,T},$$

r0 represents a scalar adjustment element for the estimated matrix $D_{EDOF_S}^{Z^t}$, $EDOF_S$ is a matrix containing the values of spectral images with extended depth of field from the image database used, $I_{CFA}^{Z^t}$ is a matrix containing the values of the mosaic image $I_{CFA}^{Z^t}(x,y)$ reconstructed from the mathematical expression of a mosaic image, for a given test depth $Z^t$, $I_{CFA}^{Z^t\,T}$ is the transpose matrix of matrix $I_{CFA}^{Z^t}$.

The transfer matrix $D_{EDOF_S}^{Z^t}$ for converting from the space of the mosaic image to the space of spectral images with extended depth of field is given by the mean of the matrices calculated with each of the images from the image database used, for a given test depth $Z^t$.

Thus a plurality of transfer matrices $D_{EDOF_S}^{Z^t}$ are respectively calculated for a plurality of depths $Z^t$ in the test depth domain.

The estimated spectral image with extended depth of field for depth $Z^t$ is obtained by matrix multiplication of matrix $D_{EDOF_S}^{Z^t}$ with a matrix $I_{CFA}^{Z^*(x,y)}$ formed from the actual mosaic image $I_{CFA}^{Z^*(x,y)}(x,y)$. The matrix operation is of the type:

$$EDOF_S^{Z^t}(x,y,\lambda) = D_{EDOF_S}^{Z^t} \cdot I_{CFA}^{Z^t}$$

As in the first embodiment, a mosaic image is reconstructed in module 26 from estimated spectral images and for test depth $Z^t$, according to the formula:

$$I_{CFA}^{Z^t}(x,y) = \sum_{i=1}^{Nf} m_i(x \cdot y) \cdot \int_\lambda h_i(\lambda) \cdot PSF(x, y, Z^t, \lambda) \otimes_{(x,y)} EDOF_s^{Z^t}(x, y, \lambda)$$

The pixel-to-pixel squared difference between the mosaic image $I_{CFA}^{Z^*(x,y)}(x,y)$ determined by module 22 and the reconstructed mosaic image $I_{CFA}^{Z^t}(x,y)$ is minimized. In other words, iteration is used to find the depth $Z^t$ at each point (x,y) in the test depth domain, which minimizes a cost criterion $W^{Z^t}(x,y)$ calculated in module 26:

$$W^{Z^t}(x,y) = \|I_{CFA}^{Z^*(x,y)}(x,y) - I_{CFA}^{Z^t}(x,y)\|^2$$

The set of estimated depth values at each position (x,y) of the image gives the estimated depth map $\hat{Z}(x,y)$.

Lastly, in module 27, the $N\lambda$ estimated spectral images with extended depth of field $EDO\hat{F}_S^{\hat{Z}(x,y)}(x,y,\lambda)$ are determined by selecting, iterating on the depth $Z^t$, only the values of estimated spectral images with extended depth of field $EDO\hat{F}_S^{Z^t}(x,y,\lambda)$ for which the considered depth $Z^t$ corresponds to the estimated depth map $\hat{Z}(x,y)$.

Figure 2:
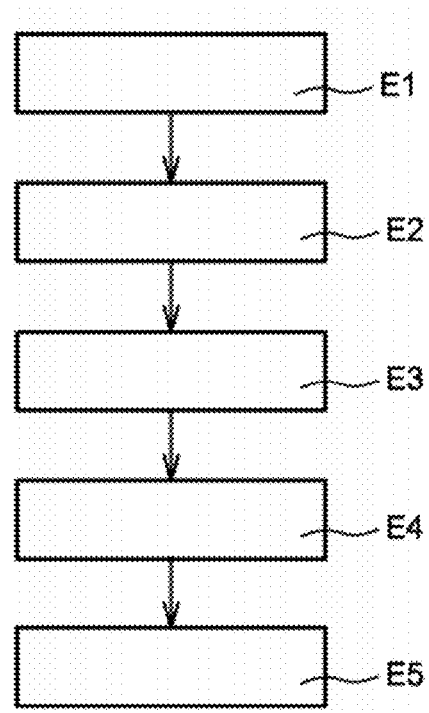
FIG. 2 represents a flowchart of the functioning of the device according to the invention.

FIG. 2 represents a flowchart of the functioning of the device presented above, in the form of a method comprising steps E1 to E5.

Step E1 is a step of capturing a scene using the device described above. Only one image capture is required in the context of the invention.

The longitudinal chromatic optical system 1 then delivers to the spectral image sensor 2 a spectral flux modulated as a function of the distance and wavelength for each point of the image.

In the next step E2, the image provided by the longitudinal chromatic optical system is received by the spectral image sensor 2. This provides a set of $N\lambda$ spectral images. Step E2 is detailed below.

In the next step E3, the $N\lambda$ spectral images are deconvoluted and used to estimate estimated spectral images with extended depth of field $EDO\hat{F}_S^{Z^t}(x,y,\lambda)$, with the assumption that $Z^t$ is equal to the actual depth of the scene observed.

The next step E4 determines an estimate $\hat{Z}(x,y)$ of the actual depth map $Z(x,y)$ of the scene considered, based on minimization of a cost criterion calculated from the mosaic image $I_{CFA}^{Z^*(x,y)}(x,y)$ provided by array 22 and on the $N\lambda$ estimated spectral images $EDO\hat{F}_S^{Z^t}(x,y,\lambda)$ provided by module 25.

The next step E5 is an adaptive selection of pixels in order to estimate a set of spectral images with extended depth of field of the scene, for the depth map $\hat{Z}(x,y)$ estimated in step E4.

Figure 3:
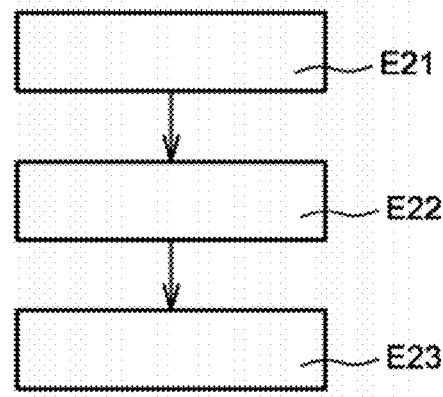
FIG. 3 represents a flowchart of the functioning of a spectral image sensor comprised in the device according to the invention.

FIG. 3 represents details of step E2, in the form of substeps E21 to E23.

In step E21, the image provided by the longitudinal chromatic optical system 1 is converted into a mosaic image $I_{CFA}^{Z^*(x,y)}(x,y)$ by the image sensor 21 and the color filter array 22.

In the next step E22, the mosaic image $I_{CFA}^{Z^*(x,y)}(x,y)$ undergoes demosaicing in order to produce Nf filtered images $SOC_{f_i}^{Z^*(x,y)}$.

The next step E23 is a spectral estimation in order to determine $N\lambda$ spectral images from the Nf filtered images $SOC_{f_i}^{Z^*(x,y)}$.

In a preferred embodiment, spectral estimation step E23 and spectral image deconvolution step E3 are combined into a single step.

In this case, a test depth domain is considered. For a given test depth $Z^t$, $N\lambda$ estimated spectral images $EDO\hat{F}_S^{Z^t}(x,y,\lambda)$ are determined.

This estimation is performed based on Nf filtered images $SOC_{f_i}^{Z^*(x,y)}(x,y)$, for example after Fourier transform of the mathematical formula giving the filtered images then transposition, in linear matrix form, of the obtained expression.

This embodiment is based on the assumption of a planar object scene, perpendicular to the optical axis of the system used, meaning that the object depth is independent of the coordinates (x,y).

We thus obtain the following linear matrix representation:

$$G_i^{Z^*} = H_i^{Z^*} \cdot S + N$$

where:

$G_i^{Z^*}$ is the matrix representation of the Fourier transform of the filtered image $SOC_{f_i}^{Z^*(x,y)}(x,y)$, S is the matrix representation of the Fourier transform of the spectral images with extended depth of field $EDOF_S$ that we wish to estimate, $H_i^{Z*}$ is the matrix representation of the product $h_i.OTF$, with OTF being the Fourier transform of the impulse response (PSF) of the optical system considered, assuming an object at actual considered depth $Z^*$, N is the matrix representation of the Fourier transform of the additive noise η.

A least squares estimate of matrix S is then given by the formula:

$$\hat{S}^{Z^t} = \left(\sum_{i=1}^{N_f} |H_i^{Z^t}| + C^2\right)^{-1} \cdot \sum_{j=1}^{N_f} \overline{H}_j^{Z^t} \cdot G_j^{Z*}$$

where:

$Z^t$ is a given depth in the test domain, $\hat{S}^{Z^t}$ is the matrix representation of the Fourier transform of the estimated spectral images with extended depth of field $\widehat{EDOF}_S^{Z^t}(x,y,\lambda)$ assuming depth $Z^t$ of the considered scene, i is the index of filter $h_i$, and j is the index of filter $h_j$, $\overline{H}_i^{Z^t}$ is the conjugate transpose of matrix $H_i^{Z^t}$, C is a matrix adjustment parameter which allows converging toward a better estimation of the spectral images $EDOF_S$ considered.

The estimated spectral images with extended depth of field $\widehat{EDOF}_S^{Z^t}(x,y,\lambda)$ are then obtained by an inverse Fourier transform of matrix $\hat{S}^{Z^t}$.

In step E4, a mosaic image $I_{CFA}^{Z^t}(x,y)$ is reconstructed by module 26 from the estimated spectral images and for test depth $Z^t$, according to the formula:

$$I_{CFA}^{Z^t}(x,y) = \sum_{i=1}^{Nf} m_i(x \cdot y) \cdot \int_\lambda h_i(\lambda) \cdot TF^{-1}\{\hat{S}^{Z^t} \cdot H_i^{Z^t}\}$$

The pixel-to-pixel squared difference between the mosaic image $I_{CFA}^{Z*(x,y)}(x,y)$ determined in step E21 and the reconstructed mosaic image $I_{CFA}^{Z^t}(x,y)$ is minimized. In other words, iteration is used to find the depth $Z^t$ at each point (x,y) in the test depth domain, which minimizes a cost criterion $W^{Z^t}(x,y)$ calculated in module 26:

$$W^{Z^t}(x,y) = \|I_{CFA}^{Z*(x,y)}(x,y) - I_{CFA}^{Z^t}(x,y)\|^2$$

The set of estimated depth values for each position (x,y) of the image gives the estimated depth map $\hat{Z}(x,y)$.

Step E5 then determines the Nλ estimated spectral images with extended depth of field $\widehat{EDOF}_S^{Z(x,y)}(x,y,\lambda)$ by selecting, iterating on the depth $Z^t$, only the values of estimated spectral images with extended depth of field $\widehat{EDOF}_S^{Z(x,y)}(x,y,\lambda)$ for which the considered depth $Z^t$ corresponds to the estimated depth map $\hat{Z}(x,y)$.

In another preferred embodiment, the demosaicing step E22, spectral estimation step E23, and spectral image deconvolution step E3 are combined into a single step.

This embodiment is based on the fact that it is possible to find a transfer law to convert from the space of the mosaic image to another space, here the space of spectral images with extended depth of field, in the form of a linear matrix representation.

This embodiment uses images from a database of images to calculate (FIG. 5) a transfer matrix $D_{EDOF_S}^{Z^t}$ for converting between the space of the mosaic image and the space of the spectral images with extended depth of field, for a test depth $Z^t$.

This embodiment is based on the assumption that the scene is a plane in the object space, perpendicular to the optical axis of the system.

The transfer matrix $D_{EDOF_S}^{Z^t}$ for converting the mosaic image to one of the images $EDOF_S$ in the space of spectral images is given by the formula:

$$D_{EDOF_S}^{Z^t} = EDOF_S \cdot I_{CFA}^{Z^t T} \cdot \left(I_{CFA}^{Z^t} \cdot I_{CFA}^{Z^t T} + r0 \cdot Id\right)^{-1}$$

where:

Id represents an identity matrix of the same size as that of matrix $$I_{CFA}^{Z^t} \cdot I_{CFA}^{Z^t T},$$

r0 represents a scalar adjustment element for the estimated matrix $D_{EDOF_S}^{Z^t}$, $EDOF_S$ is a matrix containing the values of spectral images with extended depth of field from the image database used, $I_{CFA}^{Z^t}$ a matrix containing the values of the mosaic image $I_{CFA}^{Z^t}(x,y)$ reconstructed from the mathematical expression of a mosaic image, for a given test depth $Z^t$, $I_{CFA}^{Z^t T}$ is the transpose matrix of matrix $I_{CFA}^{Z^t}$.

The transfer matrix $D_{EDOF_S}^{Z^t}$ for converting from the space of the mosaic image to the space of spectral images with extended depth of field is given by the mean of the matrices calculated with each of the images from the image database used, for a given test depth.

Thus a plurality of transfer matrices $D_{EDOF_S}^{Z^t}$, are respectively calculated for a plurality of depths $Z^t$ in the test depth domain.

The estimated spectral image with extended depth of field for depth $Z^t$ is obtained by matrix multiplication of matrix $D_{EDOF_S}^{Z^t}$, with a matrix $I_{CFA}^{Z*(x,y)}$ formed from the actual mosaic image $I_{CFA}^{Z*(x,y)}(x,y)$. The matrix operation is of the type:

$$EDOF_S^{Z^t}(x,y,\lambda) = D_{EDOF_S}^{Z^t} \cdot I_{CFA}^{Z^t}$$

As in the first embodiment, in step E4 a mosaic image is reconstructed in module 26 from estimated spectral images and for test depth $Z^t$, according to the formula:

$$I_{CFA}^{Z^t}(x,y) = \sum_{i=1}^{Nf} m_i(x \cdot y) \cdot \int_\lambda h_i(\lambda) \cdot PSF(x,y,Z^t,\lambda) \otimes_{(x,y)} EDOF_s^{Z^t}(x,y,\lambda)$$

The pixel-to-pixel squared difference between the mosaic image $I_{CFA}^{Z*(x,y)}(x,y)$ and the reconstructed mosaic image $I_{CFA}^{Z^t}(x,y)$ is then minimized, meaning that iteration is used to find the depth in the test depth domain, which minimizes a cost criterion at each position. The set of estimated depth values for all positions (x,y) of the image gives the estimated depth map $\hat{Z}(x,y)$.

Step E5 then determines the Nλ estimated spectral images with extended depth of field $\widehat{EDOF}_S^{Z(x,y)}(x,y,\lambda)$ by selecting, iterating on the depth $Z^t$, only the values of estimated spectral images with extended depth of field $\widehat{EDOF}_S^{Z^t}(x,y,\lambda)$ for which the considered depth $Z^t$ corresponds to the estimated depth map $\hat{Z}(x,y)$ (module 27).

PRIOR ART

[1]: Article entitled "Generalized Assorted Pixel Camera: Post-Capture Control of Resolution, Dynamic Range and Spectrum", by Yasuma, F.; Mitsunaga, T.; Iso, D. & Nayar, S. K. (2010), in IEEE Transactions on Image Processing;

[2]: Article entitled "Extended depth-of-field using sharpness transport across color channels" by Guichard, F.; Nguyen, H.-P.; Tessieres, R.; Pyanet, M.; Tarchouna, I. & Cao, F. (2009), in 'Proceedings of the SPIE—The International Society for Optical Engineering';

[3]: U.S. Pat. No. 7,626,769, "Extended Depth Of Field Imaging System using Chromatic Aberration", 2009, Datalogic Scanning;

[4]: Patent WO 2009/019362 "Optical System Furnished With a Device For Increasing its Depth Of Field", DxO Labs;

[5]: Article entitled "Coded Aperture Pairs for Depth from Defocus and Defocus Deblurring" by Zhou, C.; Lin, S. & Nayar, S. (2011), in International Journal on Computer Vision;

[6]: Article entitled "Statistics of spatial cone-excitation ratios in natural scenes" by Nascimento, S. M. C., Ferreira, F., and Foster, D. H. (2002), in Journal of the Optical Society of America A, 19,1484-1490;

[7]: Article entitled "Color filters including infrared cut-off integrated on CMOS image sensor" by Frey, L.; Parrein, P.; Raby, J.; Pelle, C.; Herault, D.; Marty, M. & Michailos, J. (2011), Opt. Express 19(14), 13073-13080.

The invention claimed is:

1. A method for estimating an image depth map of a scene, which comprises:
   providing an image in which the focus depends on a depth and wavelength of considered object points of the scene, using a longitudinal chromatic optical system,
   determining a set of spectral images from the image provided by the longitudinal chromatic optical system,
   deconvoluting the spectral images in order to provide estimated spectral images with extended depth of field, and
   analyzing a cost criterion that is dependent on the estimated spectral images with extended depth of field, in order to provide an estimated depth map $\hat{Z}(x,y)$ of an actual depth $Z(x, y)$, where Z is the actual depth, of the scene, and x and y are coordinates of the actual scene.

2. The method according to claim 1, wherein the step of determining a set of spectral images comprises the steps of:
   receiving the image formed by the longitudinal chromatic optical system and forming a mosaic image, using an image sensor equipped with a plurality of spectral filters,
   demosaicing the mosaic image to provide a set of filtered images, and
   performing spectral estimation to receive the set of filtered images and provide the set of spectral images.

3. The method according to claim 2, wherein the step of analyzing a cost criterion comprises:
   forming a mosaic image reconstructed from the estimated spectral images with extended depth of field of the scene, and
   estimating the depth at each point of the image by minimizing a cost criterion that is dependent on a point-to-point squared difference between the mosaic image formed and the mosaic image reconstructed from estimated spectral images with extended depth of field of the scene, for depths in a predetermined depth domain.

4. The method according to claim 1, further comprising a step of estimating a set of spectral images with extended depth of field of the scene, for the estimated depth map provided in the analysis step.

5. The method according to claim 4, wherein estimating the set of spectral images with extended depth of field of the scene comprises selecting, by iterating on the depth, values of spectral images with extended depth of field provided in the deconvolution step for which the considered depth corresponds to the estimated depth map provided in the analysis step.

6. The method according to claim 2, wherein the spectral estimation step and the spectral image deconvolution step are combined into a single step.

7. The method according to claim 2, wherein the demosaicing step, the spectral estimation step, and the spectral image deconvolution step are combined into a single step, and wherein this step uses images from a database of images to calculate a transfer matrix for converting between the space of the mosaic image and the space of the spectral images.

8. A device for estimating the image depth map of a scene, which comprises:
   a longitudinal chromatic optical system for providing an image in which the focus depends on the depth and wavelength of the considered object points of the scene;
   a spectral image sensor for receiving the image provided by the longitudinal chromatic optical system and for providing a set of spectral images; and
   a computer, the computer being configured to
   deconvolute the spectral images in order to provide estimated spectral images with extended depth of field, and
   analyze a cost criterion that is dependent on the estimated spectral images with extended depth of field, in order to provide an estimated depth map $\hat{Z}(x,y)$ of an actual depth $Z(x, y)$, where Z is the actual depth, of the scene, and x and y are coordinates of the actual scene.

9. The device according to claim 8, wherein the spectral image sensor comprises:
   an image sensor equipped with a plurality of spectral filters for receiving the image provided by the longitudinal chromatic optical system and for providing a mosaic image, wherein the computer
   demosaics to receive the mosaic image and for providing a set of filtered images,
   spectrally estimates to receive the set of filtered images and for providing the set of spectral images.

10. The device according to claim 9, wherein the computer analyzing the cost criterion is additionally configured to:
    form a mosaic image reconstructed from the estimated spectral images with extended depth of field of the scene, and
    estimate the depth at each point in the image, adapted to minimize a cost criterion that is dependent on a point-to-point squared difference between the mosaic image formed and the mosaic image reconstructed from the estimated spectral images with extended depth of field of the scene, for depths in a predetermined depth domain.

11. The device according to claim 8, wherein the computer further estimates a set of spectral images with extended depth of field of the scene, for the estimated depth map provided by the analysis module.

12. The device according to claim 11, wherein the computer is adapted to select, by iterating on the depth, values of spectral images with extended depth of field provided by the deconvolution module for which the considered depth corresponds to the estimated depth map provided by the analysis module.

13. The device according to claim 9, wherein the spectral estimation and the spectral image deconvolution are combined.

14. The device according to claim 9, wherein the demosaicing, the spectral estimation and the spectral image deconvolution are combined to use images from a database of images to calculate a transfer matrix for converting between the space of the mosaic image and the space of the spectral images.

15. A computer program stored on a non-transitory storage medium, comprising instructions for executing the steps of the method according to claim 1 when said program is executed by a computer.

16. A computer-readable non-transitory storage medium on which is stored a computer program comprising instructions for executing the steps of the method according to claim 1.

17. The method according to claim 2, further comprising a step of estimating a set of spectral images with extended depth of field of the scene, for the estimated depth map provided in the analysis step.

18. The method according to claim 3, further comprising a step of estimating a set of spectral images with extended depth of field of the scene, for the estimated depth map provided in the analysis step.

19. The method according to claim 3, wherein the spectral estimation step and the spectral image deconvolution step are combined into a single step.

20. The method according to claim 3, wherein the demosaicing step, the spectral estimation step, and the spectral image deconvolution step are combined into a single step, and wherein this step uses images from a database of images to calculate a transfer matrix for converting between the space of the mosaic image and the space of the spectral images.

* * * * *